(12) United States Patent
Yasuie et al.

(10) Patent No.: US 7,607,049 B2
(45) Date of Patent: Oct. 20, 2009

(54) APPARATUS AND METHOD FOR DETECTING NETWORK FAILURE LOCATION

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 11/413,154

(22) Filed: Apr. 28, 2006

(65) Prior Publication Data

US 2007/0174724 A1     Jul. 26, 2007

(30) Foreign Application Priority Data

Dec. 21, 2005   (JP)   ............... 2005-367936

(51) Int. Cl.
 *G06F 11/00* (2006.01)
(52) U.S. Cl. ............................. 714/43; 714/4
(58) Field of Classification Search .................. 714/41, 714/43, 44, 54; 370/242, 218, 252
 See application file for complete search history.

(56) References Cited

U.S. PATENT DOCUMENTS

| | | | | |
|---|---|---|---|---|
| 5,132,962 A | * | 7/1992 | Hobgood et al. ............ 370/223 |
| 5,983,371 A | * | 11/1999 | Lord et al. ................. 714/55 |
| 6,810,021 B1 | | 10/2004 | Sakurai | |
| 6,912,196 B1 | * | 6/2005 | Mahalingaiah ............ 370/216 |
| 7,430,164 B2 | * | 9/2008 | Bare ...................... 370/217 |
| 2005/0220036 A1 | * | 10/2005 | Sugitani et al. ........... 370/252 |
| 2006/0215546 A1 | * | 9/2006 | Tochio .................... 370/218 |

FOREIGN PATENT DOCUMENTS

JP   2005-033360   2/2005
JP   2005-179294   6/2005

OTHER PUBLICATIONS

U.S. Appl. No. 11/229,689, filed Sep. 20, 2005, Yasuie.

* cited by examiner

*Primary Examiner*—Dieu-Minh Le
(74) *Attorney, Agent, or Firm*—Fujitsu Patent Center

(57) ABSTRACT

A L2 loop failure location generated in any one of a plurality of search target apparatuses disposed in network is detected in a short time. A network failure location detecting apparatus executes the steps of broadcasting packets with a plurality of different source MAC addresses; acquiring statistical information that is information of a learning port of the plurality of different source MAC addresses learned by each of the plurality of search target apparatuses; finding whether the number of the learning ports of the plurality of different source MAC addresses is one or two from the acquired statistical information; and determining that the L2 loop failure location is the search target apparatus including two learning ports of the plurality of different source MAC addresses.

9 Claims, 14 Drawing Sheets

TABLE OF RELATIONSHIP BETWEEN OUI AND VENDOR

| | |
|---|---|
| 00-E0-00 | F COMPANY |
| 00-0D-28 | C COMPANY |
| 00-01-30 | E COMPANY |
| · · | |

| SEARCH TARGET APPARATUS | MAC ADDRESS | APPARATUS VENDOR |
|---|---|---|
| | Step.1 | Step.2 |
| SW_1 | 00-E0-00-12-34-56 | F COMPANY |
| SW_2 | 00-0D-28-12-34-56 | C COMPANY |
| SW_3 | 00-01-30-12-34-56 | E COMPANY |

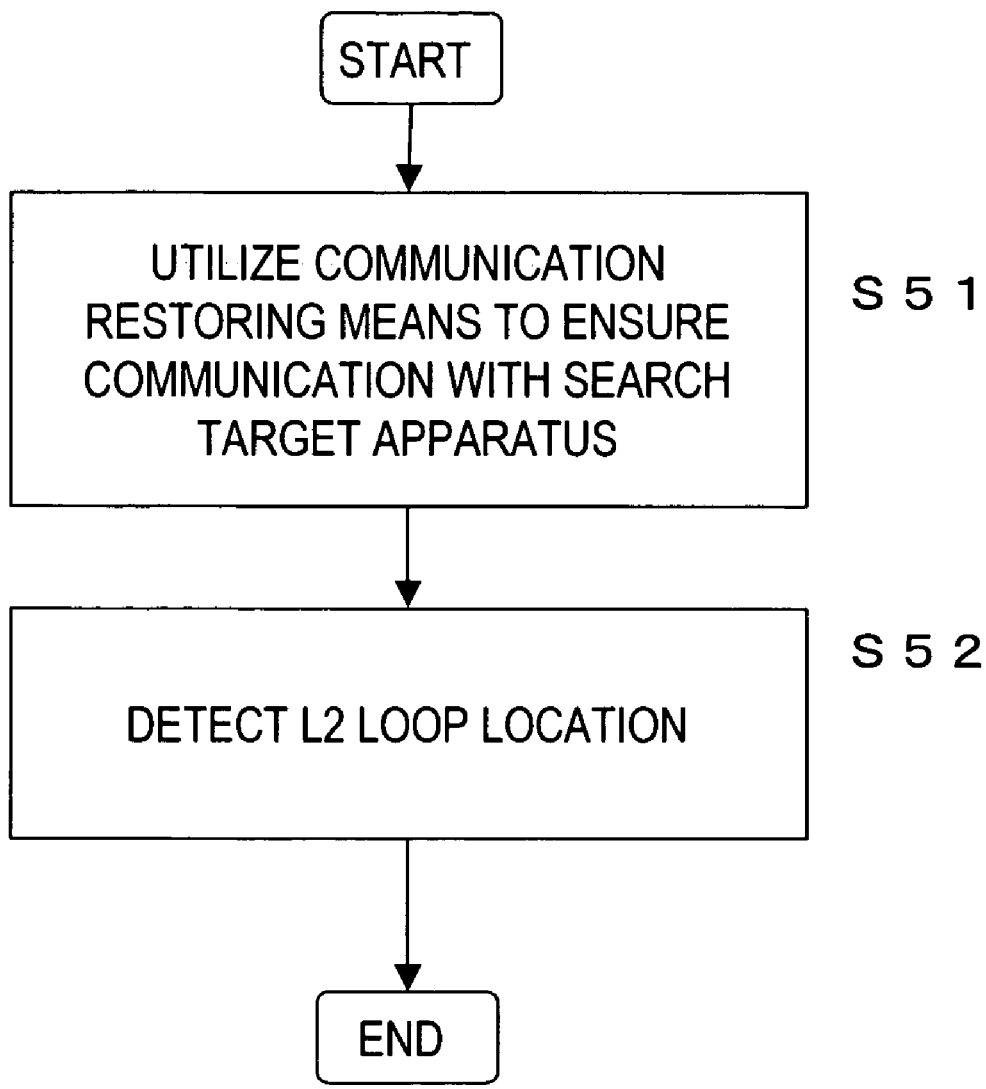

APPARATUS AND METHOD FOR DETECTING NETWORK FAILURE LOCATION

CROSS-REFERENCE TO RELATED APPLICATIONS

This application is based upon and claims the benefit of priority from the prior Japanese Patent Application No. 2005-367936, filed on Dec. 21, 2005, the entire contents of which are incorporated herein by reference.

BACKGROUND OF THE INVENTION

1. Field of the Invention

The present invention relates generally to a network failure location detecting apparatus and a network failure location detecting method that detect a failure occurring on a network, and, more particularly, to a network failure location detecting apparatus and a network failure location detecting method that detect a layer 2loop, which is a failure occurring in a relay apparatus constituting the network.

2. Description of the Related Art

A relay apparatus called a layer 2(L2) switch constituting network such as LAN is one of a relay apparatus of a network and has a function for determining a destination of a packet with data of a data link layer (second layer) in an OSI reference model to transfer the packet.

Protocols of the data link layer include MAC (media access control) in the Ethernet (registered trademark), etc. and a relay apparatus of the Ethernet (registered trademark) is also referred to as a switching hub, which refers to a MAC address to determine a destination of data.

Since protocols such as IP, TCP, and HTTP are located on a network layer (third layer) or later, the layer 2switch can transfer a packet if the protocol of the third layer or later is different.

In a network where a plurality of terminals is connected by the layer 2switch, a failure called a layer 2loop is generated in entire network by improper connection of cables or a failure of the layer 2switch. The generation of the layer 2loop causes a heavy load situation of terminals in entire network and makes the network communication impossible.

FIGS. 1 to 3 are diagrams for describing the network failure due to the layer 2loop. In FIG. 1, a network is configured by connecting a layer 2switch (hereinafter, "switch") SW1 with subsequent switches SW2, SW3, and SW4, by connecting the switches SW2, SW3, and SW4 with subsequent switches SW5, SW6, and SW7, respectively, and by connecting the switches SW5, SW6, and SW7 with terminals Y1, Y2, and X, respectively.

It is assumed that the switch SW2 is connected in loop due to improper cable connection in the switch SW2 to generate a layer 2loop.

Description will be made of the case that the terminal X transmits a broadcast packet. When the terminal X transmits the broadcast packet, the broadcast packet arrives at the switch SW2 generating the L2loop via the switches SW7, SW4, and SW1.

The broadcast packet is sent out to the entire network (subnet) from the switch SW2 every time the packet goes around the loop. Since the loop circulation is performed at a wire speed, the broadcast packet is continuously sent out from the switch SW2 at the wire speed to the entire network (which is called a broadcast storm), and the terminals in the network fall into a heavy load situation.

When the broadcast packet is input into one of a plurality of ports of each switch, the switch stores a MAC address of a source terminal included in the broadcast packet and recognizes that the direction of the transmission terminal of the broadcast packet is the direction of the input port (hereinafter, this may be represented to as "learning an address").

Therefore, due to the broadcast storm, some switches learn the address of the transmission terminal erroneously. That is, each switch recognizes that the source address of the broadcast packet is located in the direction of the L2loop occurrence location (switch SW2). Therefore, erroneous learning of the source terminal address happens in each switch on the path between the terminal X and the L2loop occurrence location.

Specifically, since the terminal X learns the address as if a virtual image of the terminal X transmitting the broadcast packet exists at the switch SW2 where the L2loop occurs, the address of the terminal X is learned erroneously by the switches SW7, SW4, SW1, and SW2 located on the path between the terminal X and the L2loop occurrence location in FIG. 1.

In this way, if a terminal transmits a broadcast packet when the L2loop occurs, the address of the terminal is learned erroneously by switches on the path from the terminal X to the location where the L2loop occurs.

The switches SW3, SW5, and SW6 do not learn erroneously merely because the packet reception directions are the same when the packet is transmitted from the actual terminal X and when the packet is transmitted from the L2loop occurrence location.

If the L2loop occurs and causes a network failure as described above, this must be searched and restored. In a method of performing such search, conventionally, if the L2loop occurs, the L2loop occurrence location has been narrowed down by manually taking out and putting in the cables of the layer 2 switch or by repeating a procedure for acquiring information about a connection status from a suspected switch. Therefore, a great deal of time (several hours to several days) and effort was needed until the L2loop occurrence location was discovered.

For example, Japanese Patent Application Laid-Open Publication No. 2001-197114 is known as a technology for detecting occurrence of the layer 2loop that causes a network failure. The technology described in Japanese Patent Application Laid-Open Publication No. 2001-197114 is a method of determining an endless loop of a frame from analysis of a reception frame to detect the L2loop.

Japanese Patent Application Laid-Open Publication No. 2005-33360 discloses an invention of detecting a loop in a network extended with the use of a bridge. In this invention, an address learning table is provided in the bridge and a loop is detected from a transition state of an entry port to the address learning table.

However, according to the Japanese Patent Application Laid-Open Publication No. 2001-197114, while it can be detected that the L2loop occurs somewhere in the network (subnet), the location of the occurrence of the L2loop cannot be identified in the subnet. According to Japanese Patent Application Laid-Open Publication No. 2005-33360, the application is limited to the particular form, that is, the application to the network extended with the use of a bridge.

Therefore, in the earlier application (Patent Application No. 2005-179294), the applicant filed an invention relating to a network failure detecting apparatus and a network failure detecting method that can detect the occurrence of the L2loop and the occurrence location thereof quickly and easily.

The invention shown in the aforementioned earlier application (Patent Application No. 2005-179294) of the applicant is a network failure detecting apparatus that is a first terminal of a plurality of terminals; each terminal detects a failure in a network constituted by connecting other terminals via at least one relay apparatus of a plurality of relay apparatuses; and the network failure detecting apparatus includes a communicating unit that acquires statistical information from a first relay apparatus of the plurality of relay apparatuses relating to data received by each of a plurality of ports of the first relay apparatus and a determining unit that determines based on the statistical information whether or not a loop causing a predetermined network failure is generated in the first relay apparatus or determines the direction from the first relay apparatus to another relay apparatus where the loop is generated.

That is, reception traffic information is acquired from a relay apparatus (switch, etc.) in a network where the L2loop is generated; the number of ports receiving a massive amount of packets is determined; and it is determined whether or not a loop is created at the relay apparatus or which port direction of the relay apparatus the loop is created.

The invention of the earlier application can identify the L2loop occurrence location. However, since the reception traffic information must be acquired a plurality of times from IFs of the relay apparatus to identify the loop location, it is problematic that a long time is needed to search a relay apparatus with many IFs. In some types of the relay apparatus, if a loop is created, the loop may be intermittently discontinued due to the influence of flow control, etc. Under such a situation, it is problematic that the loop location cannot be identified since less traffic exists in the loop direction.

SUMMARY OF THE INVENTION

It is therefore the object of the present invention to enable the identification of the location in a short time without dependency on the number of IFs of the relay apparatus and to enable the identification if the loop is intermittently discontinued.

In order to achieve the above object, according to an aspect of the present invention there is provided a method of searching for a L 2loop failure location generated in any one of a plurality of search target apparatuses disposed in a network with a network failure location detecting apparatus, wherein the network failure location detecting apparatus executes the steps of broadcasting packets with a plurality of different source MAC addresses; acquiring statistical information that is information of a learning port of the plurality of different source MAC addresses learned by each of the plurality of search target apparatuses; finding whether the number of the learning ports of the plurality of different source MAC addresses is one or two from the acquired statistical information; and determining that the L2loop failure location is the search target apparatus including two learning ports of the plurality of different source MAC addresses. The network failure location detecting apparatus may send an acquisition request command in the Simple Network Management Protocol that is a MIB (Management Information Base) acquisition request to a plurality of the search target apparatuses disposed in the network preliminarily before broadcasting the packets with the plurality of different source MAC addresses, receive response packets from the search target apparatuses capable of responding, and acquire addresses of the search target apparatuses from the received response packets. When the search target apparatus includes only one learning port of the plurality of source MAC addresses, it may be determined that a network failure location exists in the direction of the learning port. The network failure location detecting apparatus may send to the search target apparatus including two learning ports of the plurality of source MAC addresses that is determined as the L2loop failure location a message for blocking an interface of one of the two learning ports to bypass the L2loop failure.

In order to achieve the above object, according to another aspect of the present invention there is provided a network failure location detecting apparatus that detects a L2loop failure location generated in any one of a plurality of switches disposed in a network, the network failure location detecting apparatus comprising a statistical information acquiring unit that broadcasts packets with a plurality of different source MAC addresses, the statistical information acquiring unit acquiring statistical information that is information of a learning port of the plurality of different source MAC addresses learned by each of the plurality of search target apparatuses; and a data analyzing unit that finds whether the number of the learning ports of the plurality of different source MAC addresses is one or two from the statistical information acquired by the statistical information acquiring unit, the data analyzing unit determining that the L2loop failure location is the search target apparatus including two learning ports of the plurality of different source MAC addresses. The statistical information acquiring unit may send an acquisition request command in the Simple Network Management Protocol that is a MIB (Management Information Base) acquisition request to a plurality of the search target apparatuses disposed in the network preliminarily before broadcasting the packets with the plurality of different source MAC addresses, and the data analyzing unit may receive response packets from the search target apparatuses capable of responding and acquire addresses of the search target apparatuses from the received response packets. When the search target apparatus includes only one learning port of the plurality of source MAC addresses, the data analyzing unit may determine that a network failure location exists in the direction of the learning port. The statistical information acquiring unit may send to the search target apparatus including two learning ports of the plurality of source MAC addresses that is determined as the L2loop failure location a message for blocking an interface of one of the two learning ports to bypass the L2loop failure. The network failure location detecting apparatus may be constituted by a terminal connected to any one of a plurality of the switches disposed in the network.

According to the present invention, the occurrence of the loop causing a failure in a network and the occurrence location thereof can be detected in a short time. Particularly, if the loop packet is intermittently discontinued, the occurrence location can be detected.

The loop can be detected by the process of the terminal constituting the network and the loop can be detected without the process of the relay apparatus constituting the network. That is, while a relatively great deal of effort and time is needed for implementing a new function in the relay apparatus, since the present invention does not need such implementing and is the process executed by the terminal to which a new function can be added merely by installing an application program, the present invention can be realized in an easy, simple, and versatile manner by installing and executing an application program for executing the process of the present invention in the terminal.

BRIEF DESCRIPTION OF THE DRAWINGS

The above and other objects, aspects, features and advantages of the present invention will become more apparent from the following detailed description when taken in conjunction with the accompanying drawings, in which.

Figure 6:
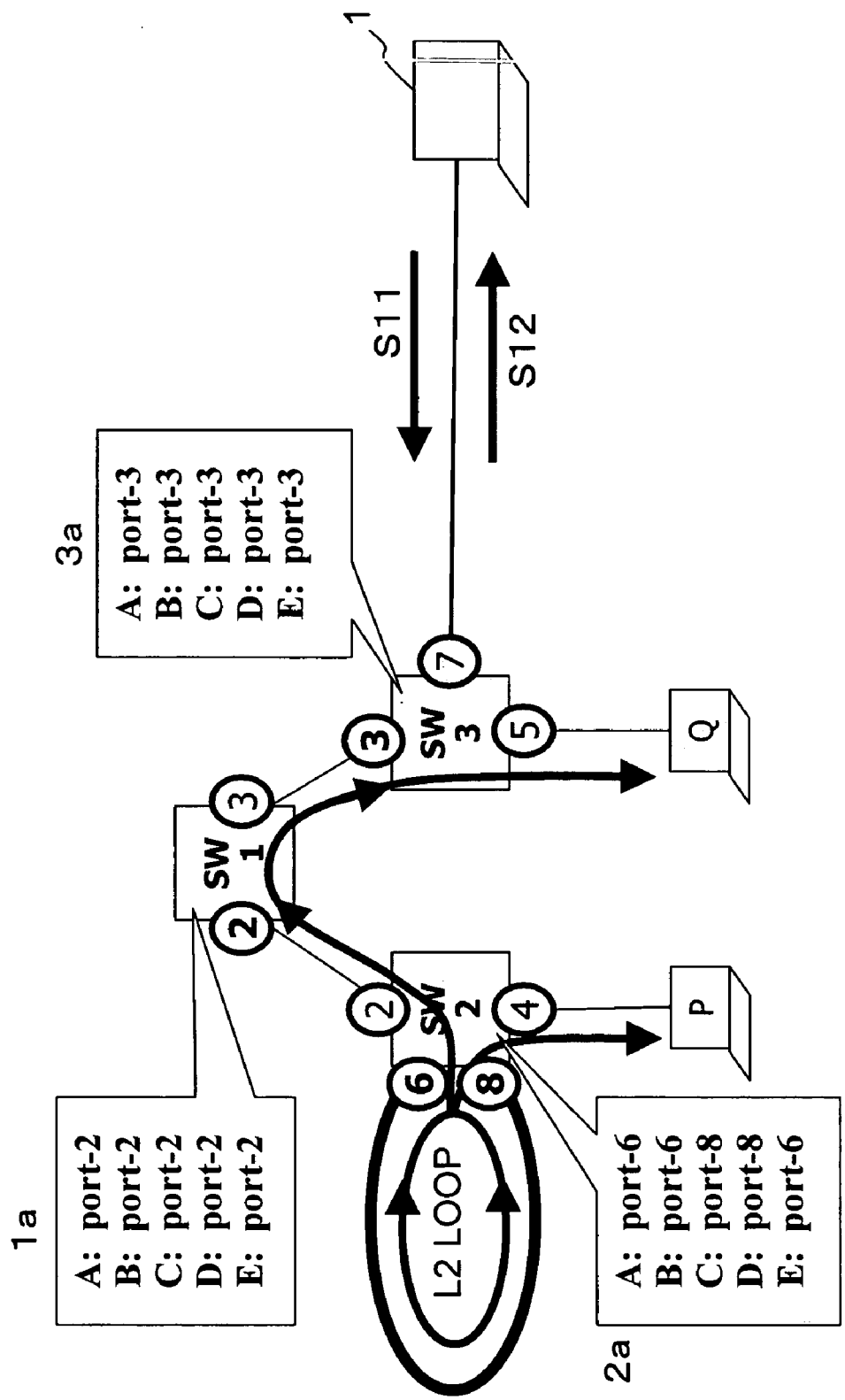
FIG. 6 shows a procedure of detecting the L2loop location in a network shown as an embodiment.
Figure 7:
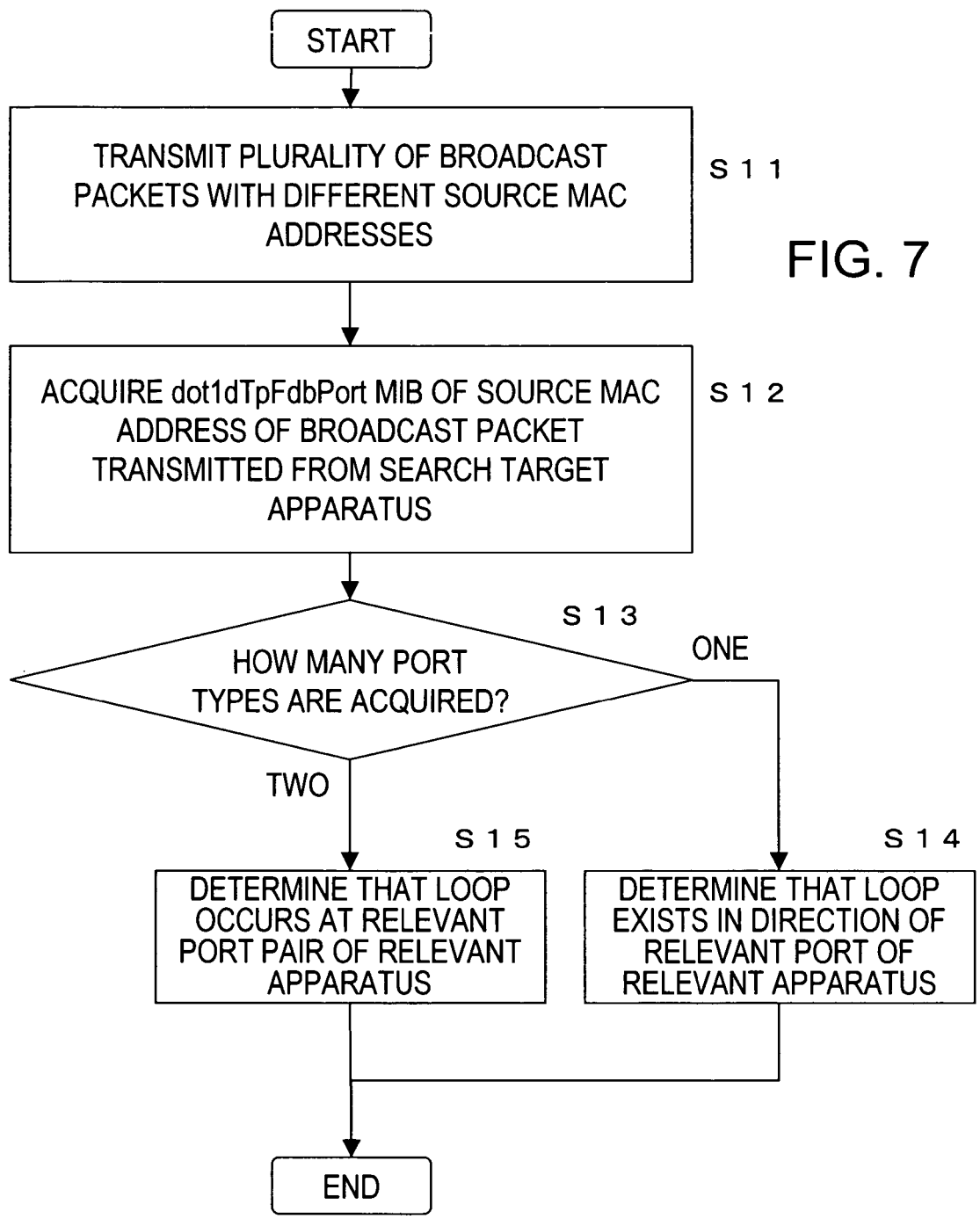
Figure 8:
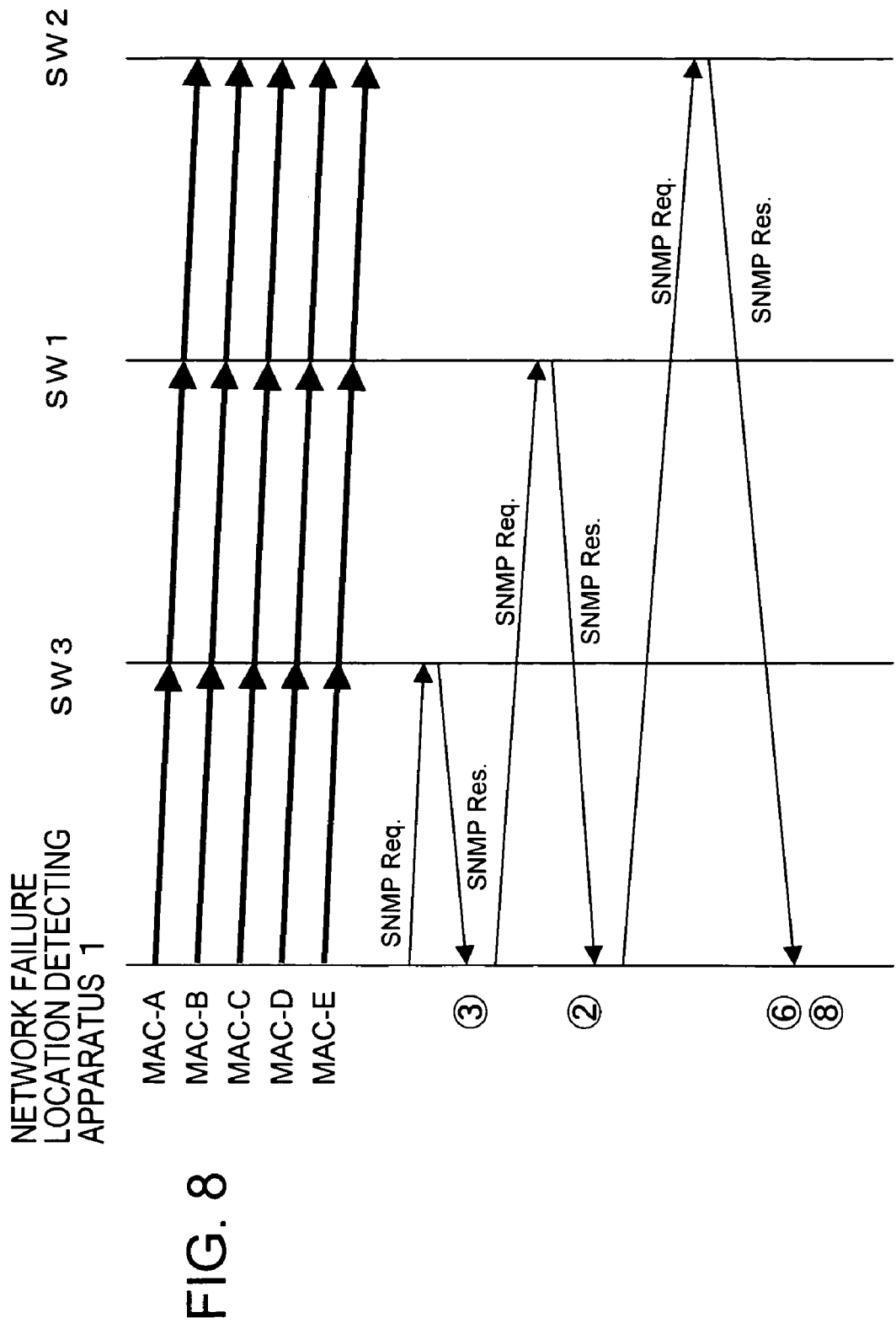
Figure 9:
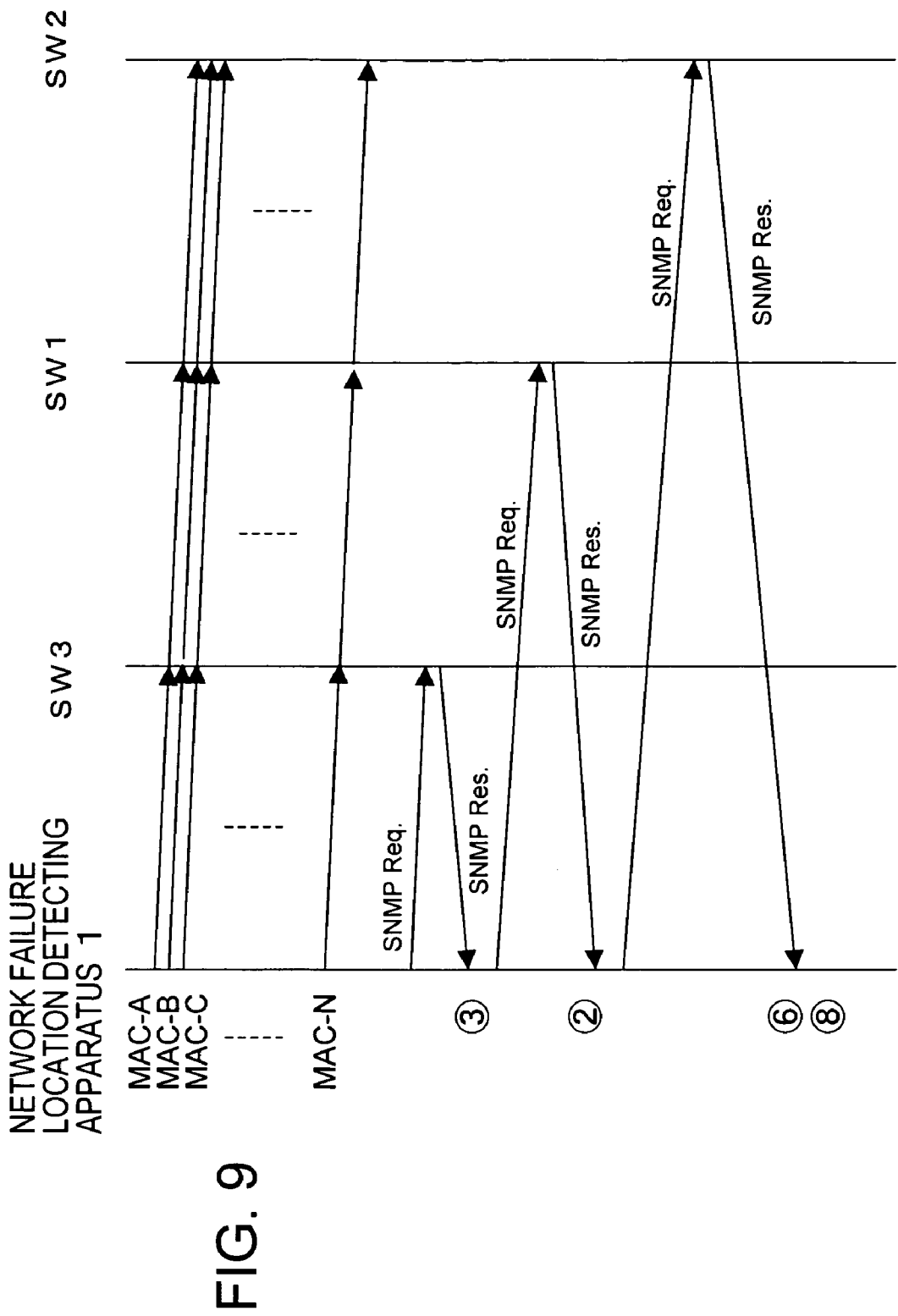
Figure 10:
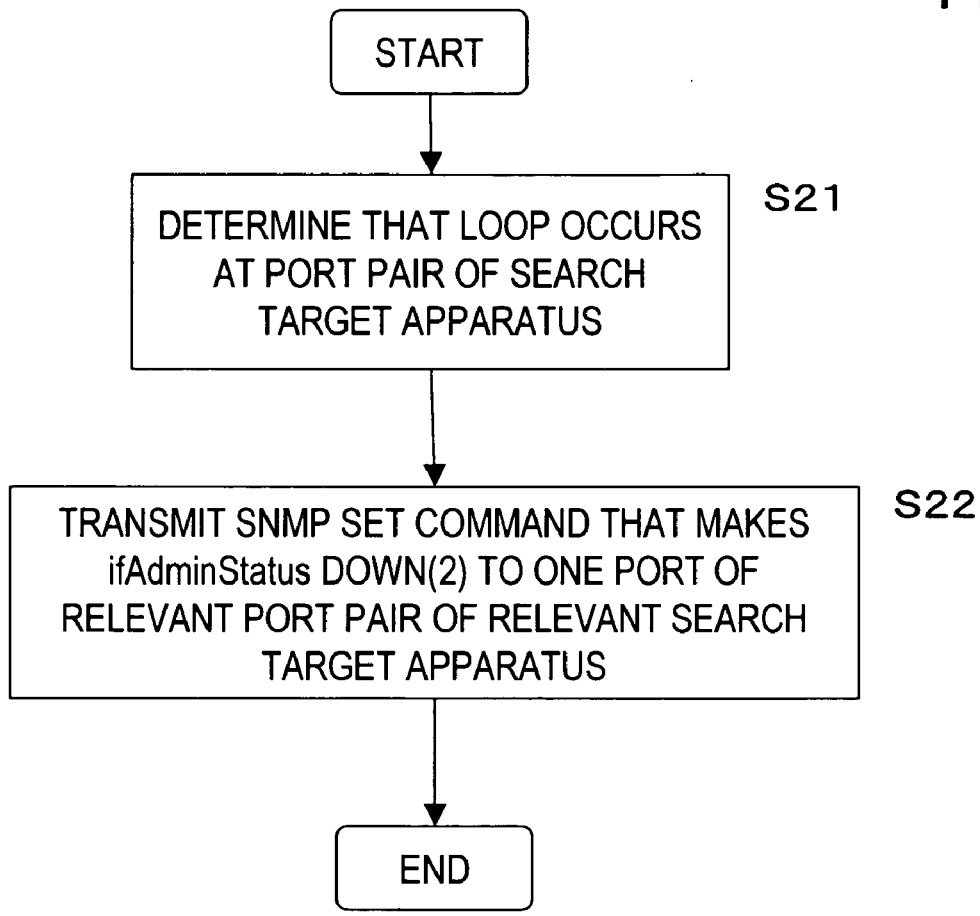
Figure 11:
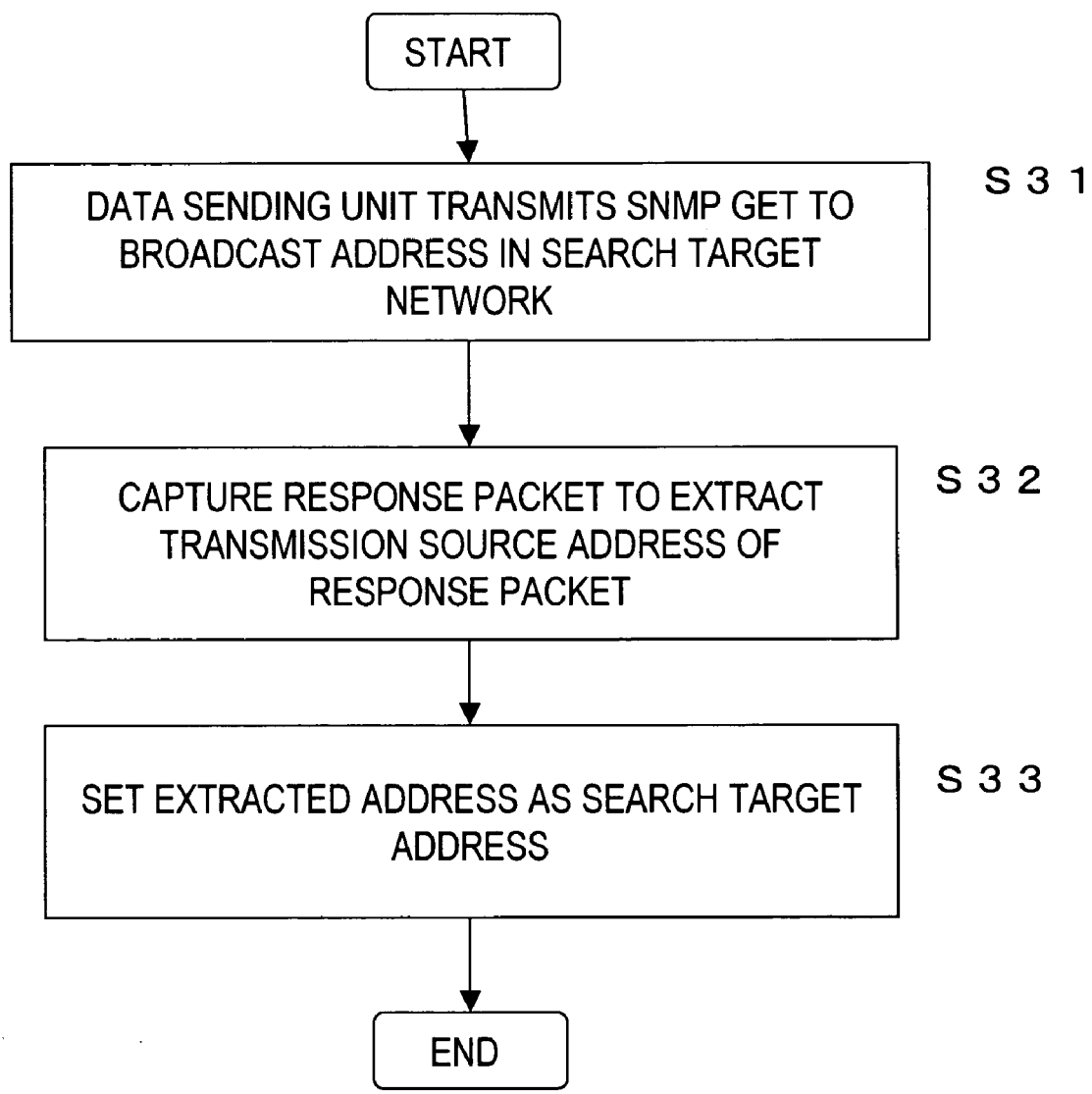
Figure 12:
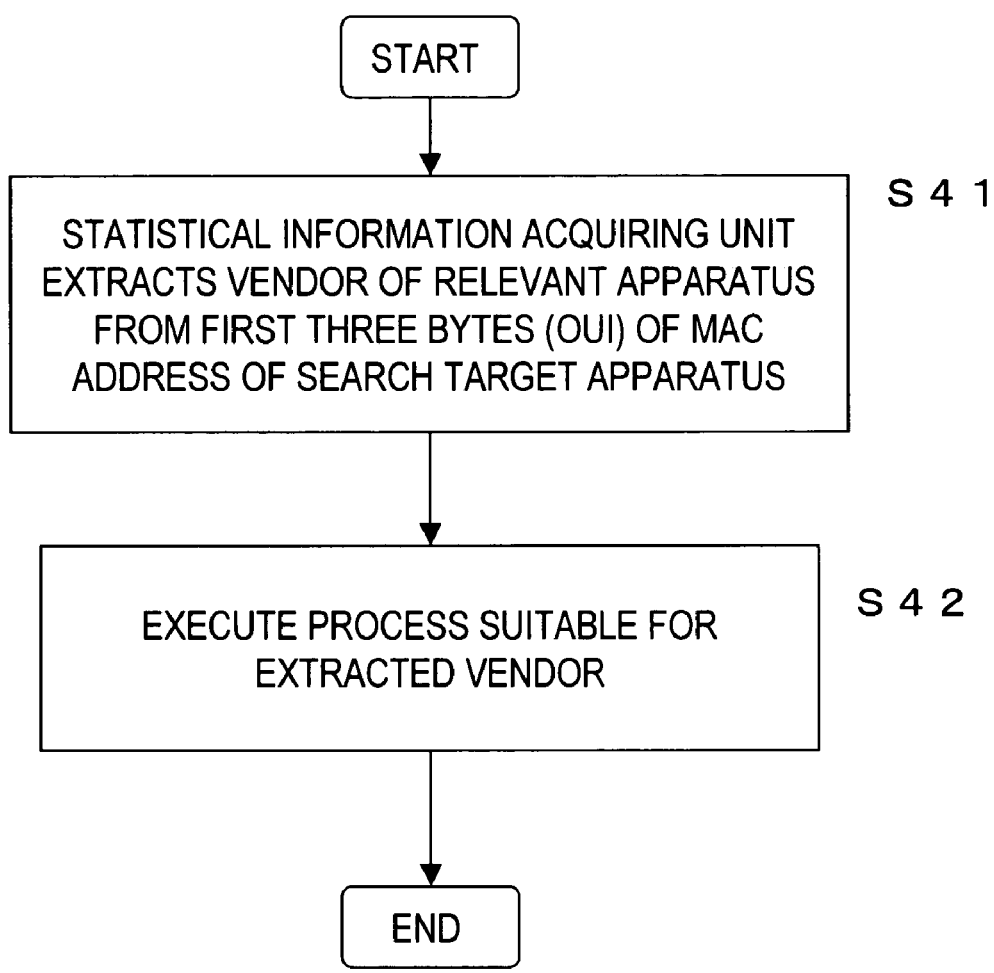

A process flowchart of a network failure detecting apparatus in a first embodiment of the present invention;

FIG. 7 is an operation flow corresponding to FIG. 6;

FIG. 8 is a sequence chart corresponding to an example of broadcasting different source MAC addresses (A, B, C, D, and E);

FIG. 9 is a sequence chart that solves a problem in the method of broadcasting the packets with different source MAC addresses described in FIG. 8;

FIG. 10 is a flow of a method of a bypass process for the L2loop failure occurrence location;

FIG. 11 is a process flowchart for obtaining addresses of search target switches;

FIG. 12 shows a flow of a process considering characteristics of the vendor of the search target switch;

FIG. 13 shows an example of the table that shows a relationship between the first three bytes (OUI) of the MAC addresses obtained and stored in advance and the vendors;

FIG. 14 shows a table that correlates the extracted apparatus vendors with the search target apparatuses (switches) and the MAC addresses thereof; and FIG. 15 is a flow that shows a procedure of detecting a location linked to the communication restoring means corresponding to the vendor.

DESCRIPTION OF THE PREFERRED EMBODIMENTS

Description will be made of embodiments of the present invention with reference to the drawings. It is to be noted that such embodiments are for the purpose of understanding the present invention and that they are not intended to limit the technical scope of the present invention.

First, with regard to the overview of the present invention, if an L2loop, i.e., a network failure occurs, a broadcast packet sent out within the same subnet arrives at a relay apparatus (switch) constituting the L2loop and is sent out to the whole area of the same subnet every time the packet goes around the loop. Each relay apparatus receives the broadcast packet from the direction of the location where the loop exists and learns the source MAC address of the broadcast packet in the same port direction.

Focusing attention on the learning of the source MAC address in the relay apparatus, when the L2loop occurs, the relay apparatus constituting the loop learns the source MAC address of the broadcast packet at one port in one direction. Particularly, the relay apparatus constituting the loop has clockwise and anticlockwise rotations of the loop. Therefore, the source MAC address of the broadcast packet is learned in either of two port directions.

Figure 1:
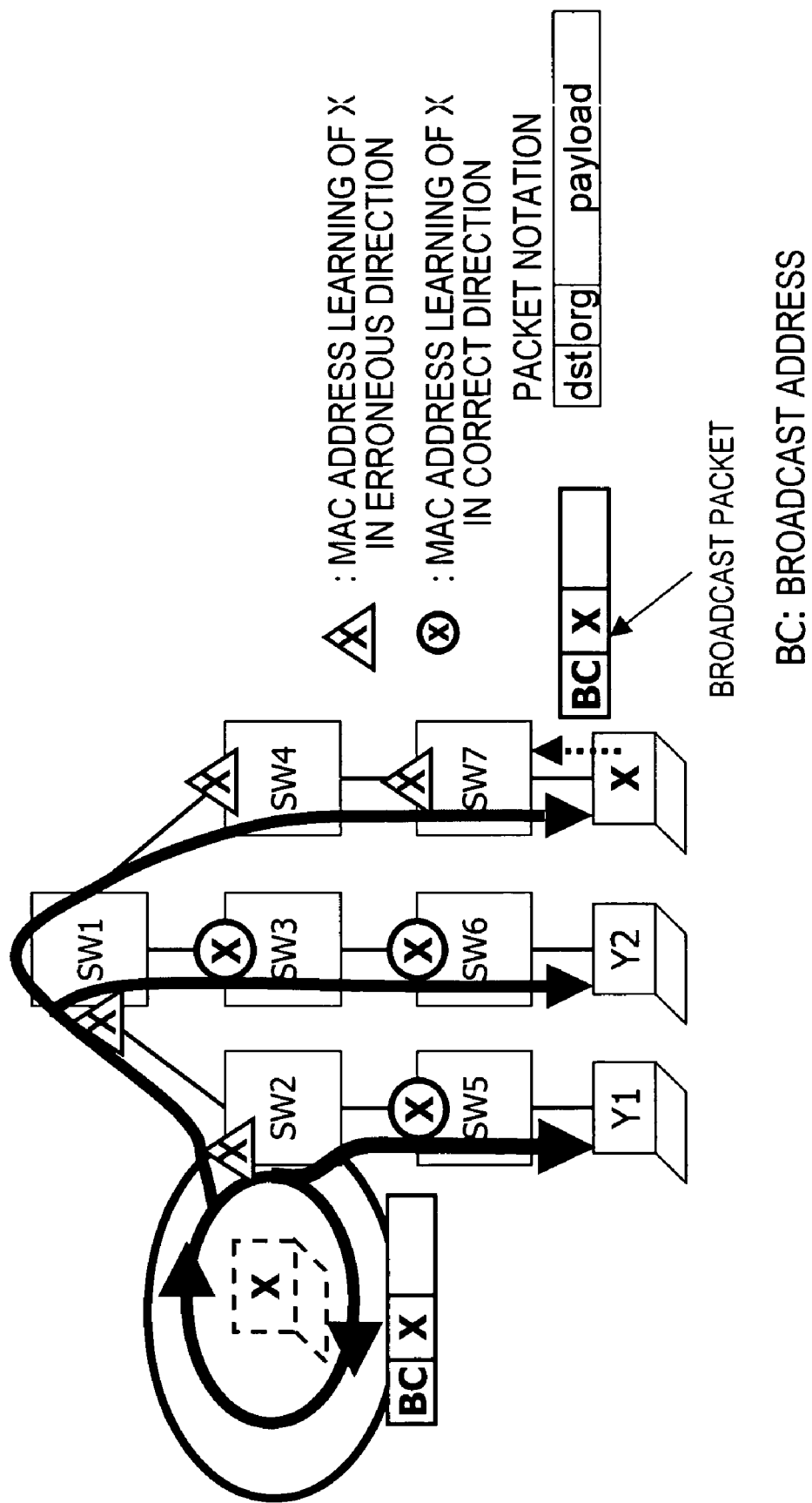
FIG. 1 is a diagram for describing a network failure due to a layer 2loop.
Figure 2:
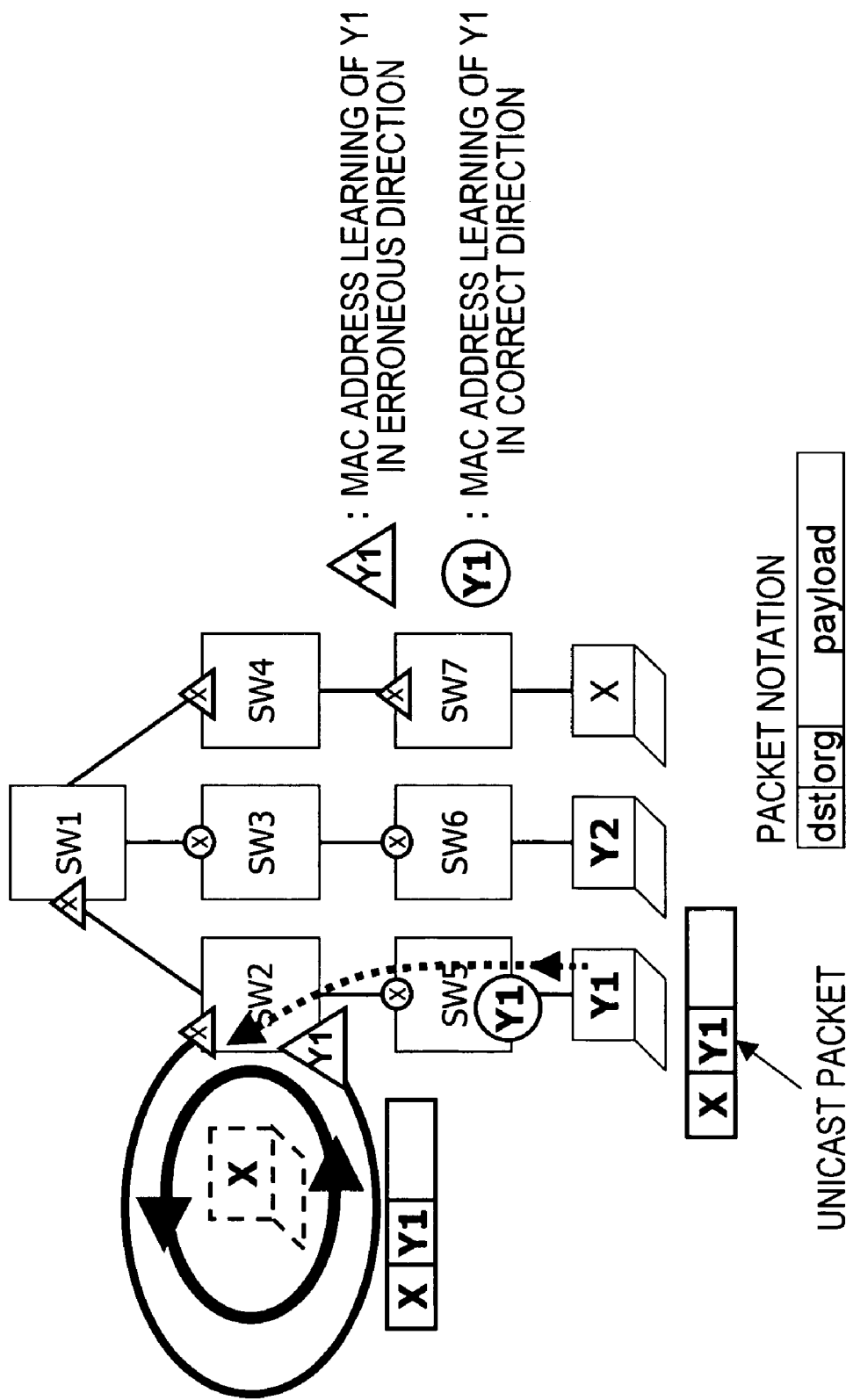
FIG. 2 is a diagram for describing a network failure due to a layer 2loop.
Figure 3:
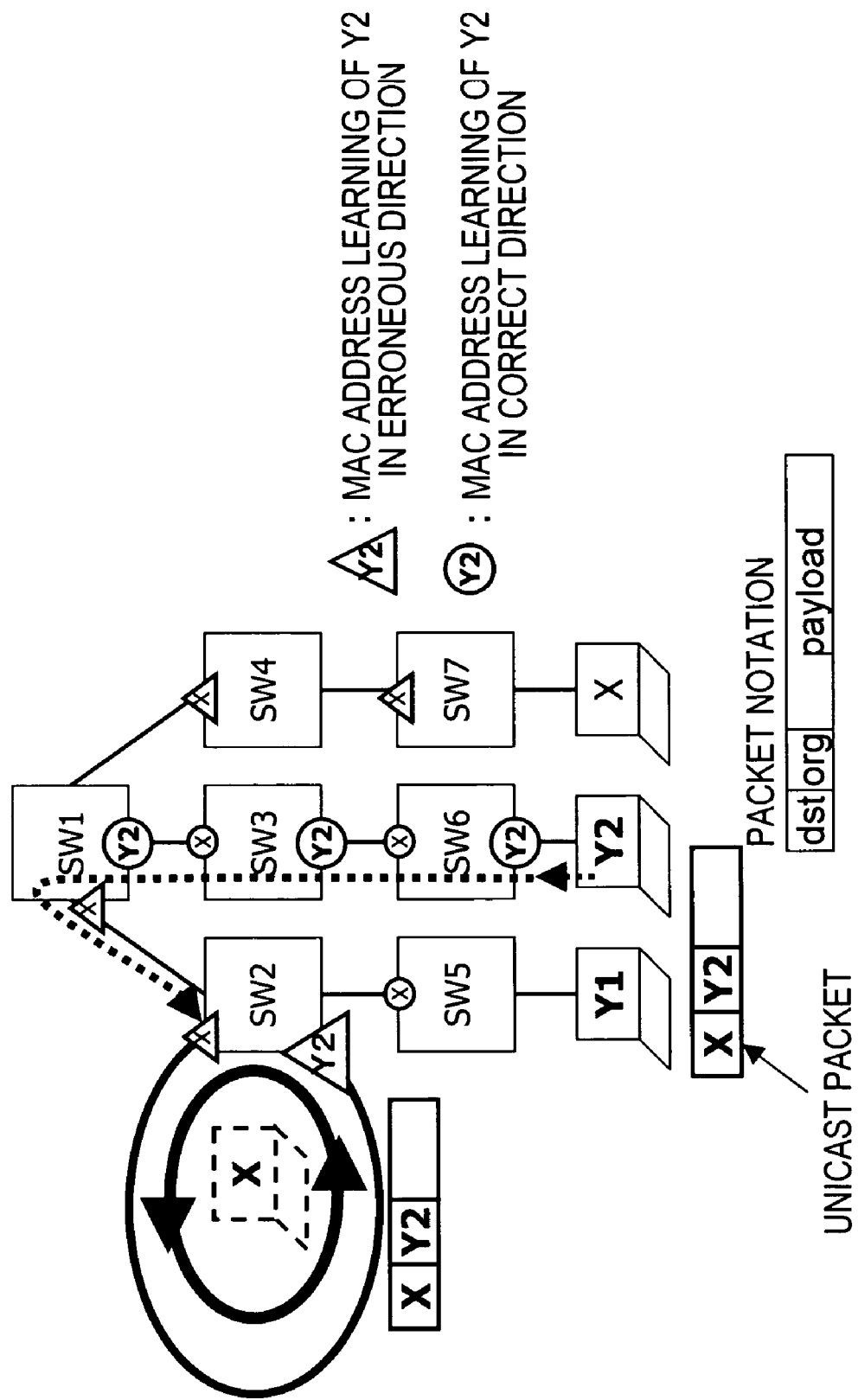
FIG. 3 is a diagram for describing a network failure due to a layer 2loop.
Figure 4:
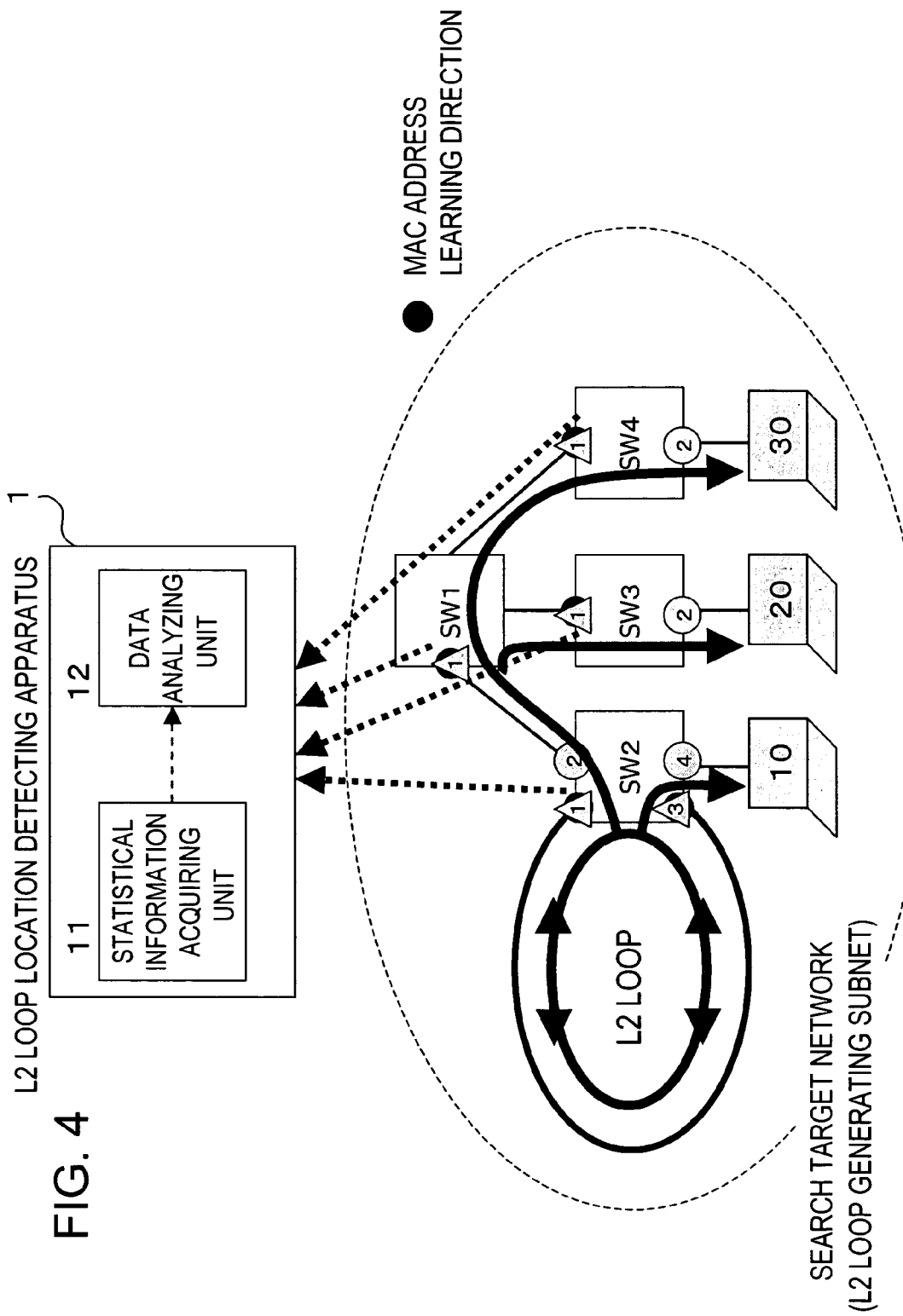
FIG. 4 shows a configuration example of a network failure location detecting system according to the principle of the present invention.

FIG. 4 shows a configuration example of a network failure location detecting system according to the principle of the present invention in consideration of such situations. In FIG. 4, a network is constituted by connecting a layer 2switch SW1 with subsequent switches SW2, SW3, and SW4 and by connecting the switches SW2, SW3, and SW4 with terminals 10, 20, and 30.

The solution principle of the present invention is applied to an L2loop failure (network failure) location detecting apparatus 1, which may be an apparatus that is incorporated into the network by connecting suitably to act as one terminal. In one requirement, a statistical information acquiring unit 11 and a data analyzing unit 12 are included, which are a function that can collect statistical information including information of the MAC address learning direction described above from a plurality of relay apparatuses (switches) connected to the network.

In the example shown in FIG. 4, the L2loop is generated at a port 1 and a port 3 of the switch 2; the broadcast packets are continuously sent out at wire speed due to the L2loop; in the switch SW2, the port 1 and the port 3 constituting the L2 loop are a massive reception port; and in the switches SW1, SW3, and SW4, respective ports 1 in the direction of the switch SW2 are massive reception ports. That is, in the switches SW1, SW3, and SW4, the source address of the broadcast packet is learned in one port direction and, in the switch SW2, the source address of the broadcast packet is learned in either of two port directions.

Figure 5:
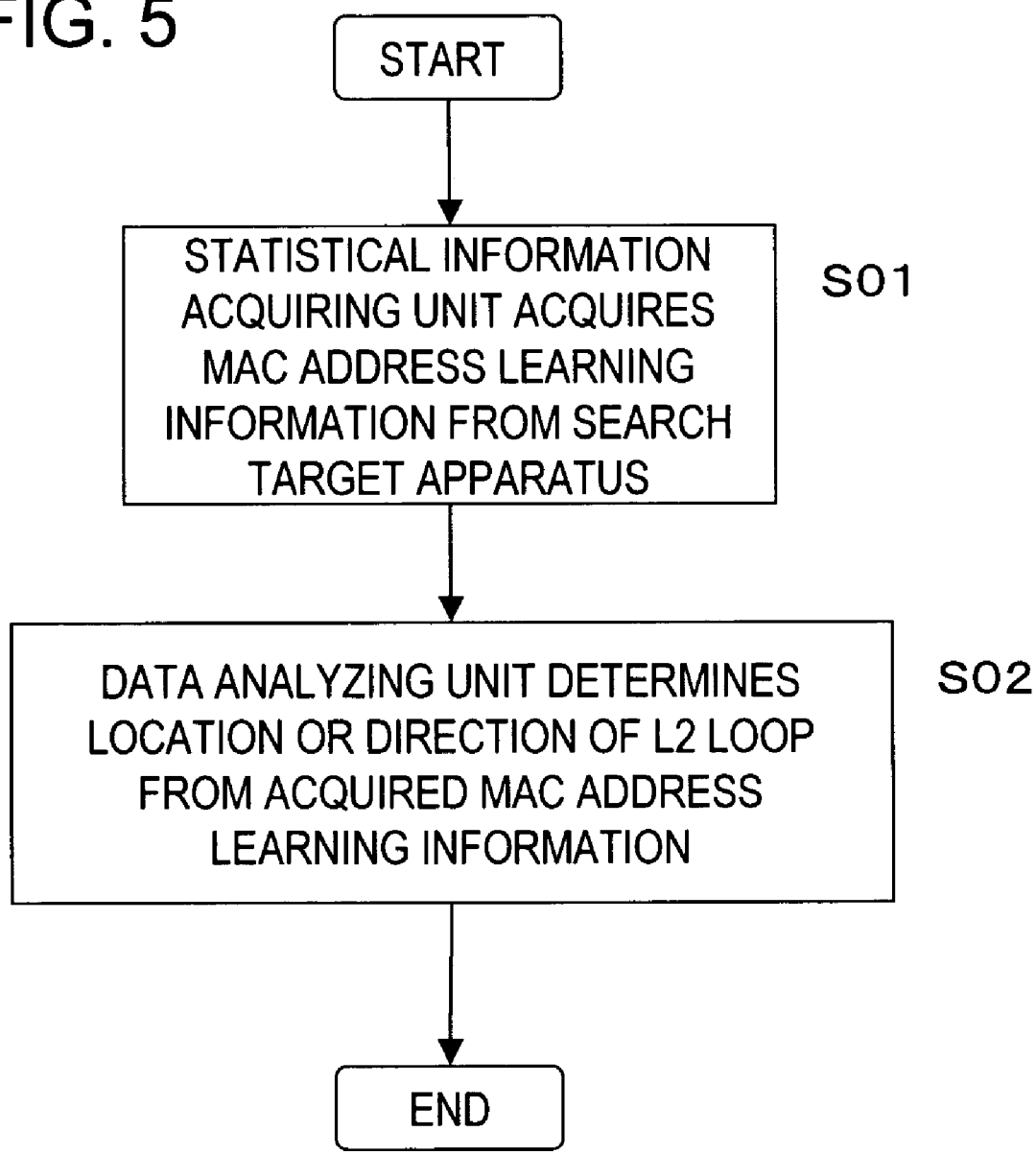
FIG. 5 is a process flow shown in FIG. 5 corresponding to FIG. 4.

In a process flow shown in FIG. 5 corresponding to FIG. 4, the statistical information acquiring unit 11 of the network failure location detecting apparatus 1 acquires the information of the MAC address learning direction for each of the switches SW1, SW2, SW3, and SW4, which are relay apparatuses (step S01).

The statistical information acquired by the statistical information acquiring unit 11 is analyzed by the data analyzing unit 12 to detect the L2loop location. In the detection of the L2loop location, a switch with two learning ports for a plurality of different source MAC addresses is detected, and it is determined that the L2loop failure occurs at this switch.

Description will be made of a specific embodiment corresponding to the principle configuration shown in FIGS. 4 and 5.

FIG. 6 shows a procedure of detecting the L2loop location in a network shown as an embodiment and FIG. 7 is an operation flow corresponding to FIG. 6.

In FIG. 6, the network includes switches SW1, SW2, and SW3, and it is assumed that the L2loop failure occurs at the switch SW2. The network failure location detecting apparatus 1 is connected to the SW3.

In the example shown in FIG. 6, the L2loop occurs at a pair of port numbers 6 and 8 of the switch SW2. When the L2loop failure location is detected, first, the network failure location detecting apparatus 1 transmits a plurality of broadcast packets with respective different dummy source MAC addresses (A, B, C, D, and E) (step S11). These broadcast packets are transferred in loop within the L2loop.

Each switch SW1, SW2, SW3 is provided with a MAC address table 1a, 2a, and 3a.

Due to the L2loop, for the plurality of broadcast packets with the dummy source MAC addresses (A, B, C, D, and E), the MAC address learning table 1a of the switch SW1 learns that a single port No. 2 is a port inputting the broadcast packets of all the MAC addresses A, B, C, D, and E. In this way, it can be recognized that the L2loop failure exists in the input direction of the port No. 2 of the switch SW1.

Similarly, the MAC address learning table 3a of the switch SW3 learns that a single port No. 3 is a port inputting the broadcast packets of all the MAC addresses A, B, C, D, and E.

That is, it can be recognized that the L2loop failure exists in the input direction of the port No. 3 of the switch SW3.

On the other hand, in the MAC address learning table 2a of the switch SW2, each MAC address is learned at a port No. 6 or No. 8. That is, in the example shown in FIG. 6, the learning table 2a learns that the port No. 6 is a port inputting the MAC addresses A, B, and E and that the port No. 8 is a port inputting the MAC addresses C and D. This is because in the switch SW2, the broadcast packets flow from the ports with Nos. 6 and 8 in both directions, and the source MAC addresses of the input packet and the input ports thereof are learned randomly.

After the transmission of the plurality of broadcast packets with the different source MAC addresses (A, B, C, D, and E), the network failure location detecting apparatus 1 acquires a learning direction MIB (dot1dTpFdbPort MIB: Management Information Base), which is statistical information defined in RFC 1156 and RFC 1213, from each switch SW1, SW2, SW3 (step S12).

When the learning direction MIB is acquired, the network failure location detecting apparatus 1 determines in the data analyzing unit 12 in accordance with the criteria described in FIG. 4 as follows.

(1) The learning direction acquired from the switch SW3 is only one type, i.e., the port No. 3, for all the source MAC addresses. Therefore, with regard to the switch SW3, the L2loop exists in the direction of the port No. 3.

(2) The learning direction acquired from the switch SW1 is only one type, i.e., the port No. 2, for all the source MAC addresses. Therefore, with regard to the switch SW2, the L2loop exists in the direction of the port No. 2.

(3) On the other hand, the learning direction acquired from the switch SW1 includes two types. Therefore, a type of the acquired port is determined for each switch SW1, SW2, SW3 (step S13). With regard to the Switches SW1 and SW2, since only one type of the port is included, it is determined that the L2loop exists in the direction of the port (step S14). On the other hand, with regard to the switch SW2, since two types of the ports (port Nos. 6 and 8), the L2loop is generated at the switch SW2 (step S15).

Description will be made of an aspect of the broadcast transmission of a plurality of the packets with different source MAC addresses from the network failure location detecting apparatus 1 for searching the L2loop failure location.

FIG. 8 is a sequence chart corresponding to the example of broadcasting the different source MAC addresses (A, B, C, D, and E) described above.

The statistical information acquiring unit 11 of the network failure location detecting apparatus 1 broadcasts packets MAC-A, MAC-B, MAC-C, MAC-D, and MAC-E with the different source MAC addresses (A, B, C, D, E) in large amounts, for example, 1000 packets, for each address sequentially.

First, when 1000 packets of MAC-A with the source MAC address A are broadcasted, the packets MAC-A with the source MAC address A flow in to the L2loop in the direction for inputting into either or both of the ports 6 and 8 at the switch SW2.

When 1000 packets of MAC-B with the source MAC address B are broadcasted, the packets MAC-B with the source MAC address B flow into the L2loop in the direction for inputting into either or both of the ports 6 and 8 at the switch SW2 and the preceding MAC-A is replaced by the MAC-B. The source MAC address A is kept for a certain period in a state of being learned in the direction of either the input port 6 or 8 immediately before being replaced by the MAC-B. Similarly, each of the packets MAC-C, D, and E with the source MAC addresses C, D, E are subsequently broadcasted, and each source MAC address is kept for a certain period in a state of being learned in the direction of either the port 6 or 8.

On this occasion, in the switches SW3 and SW1, the MAC address is learned at only one port.

The statistical information acquiring unit 11 of the network failure location detecting apparatus 1 requests the notification of the learned MAC address to each of switches SW1, SW2, and SW3 in SNMP (Simple Network Management Protocol) (SNMP Req.). The switches SW1, SW2, and SW3 notify the statistical information acquiring unit 11 of the network failure location detecting apparatus 1 of the information on the learning ports of the source MAC address (SNMP Res.)

The statistical information acquiring unit 11 of the network failure location detecting apparatus 1 sends the notified information to the data analyzing unit 12, which determines that the switch SW2 learns different source MAC addresses at two different ports, and the L2loop failure location is certified. The more the types of the different MAC addresses are initially sent out, the higher the probability of being learned at two ports and the higher the determination accuracy.

While the packets with different source MAC addresses are sent out in large amounts for each address and the packets with each source MAC address are replaced to acquire the learning state after steadying the learning state in the procedure shown above, FIG. 9 is a procedure when each of a plurality N of packets with different source MAC addresses is sent one-by-one sequentially.

In this case, when the packet MAC-A with the source MAC address A is broadcasted, the packet MAC-A with the source MAC address A flows into the L2loop in the direction for inputting into either or both of the ports 6 and 8 at the switch SW2 and, subsequently, the packets MAC-A with the source MAC addresses B, C, D, and e flow similarly.

The notification of the learned MAC address is requested in SNMP (Simple Network Management Protocol) to each of the switches SW1, SW2, and SW3 (SNMP Req.). Since the switch SW2 learns in the direction of either the port 6 or 8 at a certain instant, the statistical information acquiring unit 11 of the network failure location detecting apparatus 1 is notified for the port information that is learned at the timing of acquiring SNMP.

The statistical information acquiring unit 11 of the network failure location detecting apparatus 1 sends the notified information to the data analyzing unit 12, which determines that the switch SW2 learns different source MAC addresses at two different ports, and the L2loop failure location is certified. The more the types of the different MAC addresses are initially sent out, the higher the probability of being learned at two ports and the higher the determination accuracy.

Description will be made of a method of a bypass process for the L2loop failure location determined in the above procedure. FIG. 10 is a flow of a method of a bypass process for the L2loop failure occurrence location.

As described above, it is determined that a loop is created at a pair of port numbers 6 and 8 of the switch SW2 in the method of the embodiment according to the present invention (step S21).

To bypass the L2loop, a Set command is transmitted to the switch SW2, and the Set command is a command that electrically disconnects the interface of either the port No. 6 or No. 8 of the switch SW2 (a command that makes ifAdminStatus MIB down(2)) (step S22). In this way, the L2loop location of the switch SW2 can be not only detected but also bypassed.

In the present invention, the addresses of the search target switches must be acquired in advance to acquire the statistical information from the search target switches.

FIG. 11 is a process flowchart for acquiring the addresses of the search target switches. The network failure location detecting apparatus 1 transmits a SNMPGet command that is a predetermined MIB acquisition request to the broadcast addresses of the search target network (S31). The network failure location detecting apparatus 1 receives response packets from switches that can respond to the SNMPGet command and extracts the transmission source addresses from the received packets (S32). In this way, the addresses of the search target switches can be acquired. The extracted addresses are set as the addresses of the search target switches (S33).

Since the response packets are unlikely to be received from the switches in the network (subnet) when the L2loop is generated, for example, this address acquisition process is preferably performed when it is clear that the communication in the network is normal (when the L2loop is not generated).

The first three bytes of the acquired switch address (MAC address) are the OUI (Organizationally Unique Identifier) that identifies the vendor of the switch and the network failure location detecting apparatus 1 may perform a process considering characteristics of the vendor of the search target switch.

FIG. 12 shows a flow of a process considering characteristics of the vendor of the search target switch. The statistical information acquiring unit 11 of the network failure location detecting apparatus 1 preliminarily maintains the first three bytes (OUI: Organizationally Unique Identifier) of the MAC addresses of search target apparatuses (switches) and a table that shows relationships with apparatus vendors (step S41).

FIG. 13 is an example of the table that shows a relationship between the first three bytes (OUI) of the MAC addresses acquired and stored in advance and the vendors.

The vendors of the relevant search target apparatuses (switches) are extracted from the first three bytes (OUI) of the MAC addresses. FIG. 14 shows a table that correlates the extracted apparatus vendors with the search target apparatuses (switches) and the MAC addresses thereof. A process is performed correspondingly to the relevant vendors (e.g., different communication restoring means depending on the vendors) (step S42).

FIG. 15 is a flow that shows a procedure of detecting a location linked to the communication restoring means corresponding to the vendor.

That is, first, the communication restoring means are utilized to ensure the packet communication with the search target apparatus (switch) (step S51).

A plurality of broadcast packets with dummy source MAC addresses is transmitted as described above in the embodiment according to the present invention and a location causing the L2loop failure is detected in the sequence of FIG. 8 or 9 (step S52).

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A method of searching for a L2 loop failure location generated in any one of a plurality of search target apparatuses disposed in a network with a network failure location detecting apparatus, the method comprising:

broadcasting, from the detecting apparatus, a plurality of packets respectively having different source MAC addresses;

acquiring statistical information of learning ports, which have learned the plurality of different source MAC addresses in each of the plurality of search target apparatuses;

finding whether there are, in any of the plurality of search target apparatuses, two learning ports which have respectively learned different source MAC addresses from the acquired statistical information; and determining that the L2 loop failure location is at the search target apparatus of which two learning ports are found as respectively having learned the different source MAC addresses.

2. The network failure location detecting method according to claim 1, further comprising:

sending, from the detecting apparatus, an acquisition request command in the Simple Network Management Protocol that is a MIB (Management Information Base) acquisition request to the plurality of search target apparatuses disposed in the network preliminarily before broadcasting the packets respectively having different source MAC addresses;

receiving response packets from the search target apparatuses capable of responding; and acquiring addresses of the search target apparatuses from the received response packets.

3. The network failure location detecting method according to claim 1, wherein if the finding finds a search target apparatus that includes only one learning port which has learned the plurality of source MAC addresses, the determining determines that a network failure location exists in the direction of the one learning port.

4. The network failure location detecting method according to claim 1, further comprising:

sending from the detecting apparatus to the search target apparatus including the two learning ports which have respectively learned different source MAC addresses, a message for blocking an interface of either one of the two learning ports to bypass the L2loop failure.

5. A network failure location detecting apparatus that detects a L2 loop failure location generated in any one of a plurality of switches disposed in a network, the network failure location detecting apparatus comprising:

a statistical information acquiring unit to broadcast a plurality of packets respectively having different source MAC addresses, and to acquire statistical information of learning ports, which have learned the plurality of different source MAC addresses in each of the plurality of search target apparatuses; and a data analyzing unit to find whether there are, in any of the plurality of search target apparatuses, two learning ports which have respectively learned different source MAC addresses from the acquired statistical information and to determine that the L2 loop failure location is at the search target apparatus of which two learning ports are found as respectively having learned different source MAC addresses.

6. The network failure location detecting apparatus according to claim 5, wherein the statistical information acquiring unit sends an acquisition request command in the Simple Network Management Protocol that is a MIB (Management Information Base) acquisition request to the plurality of search target apparatuses disposed in the network preliminarily before broadcasting the packets respectively having different source MAC addresses, and wherein the data analyzing unit receives response packets from the search target apparatuses capable of responding and acquires addresses of the search target apparatuses from the received response packets.

7. The network failure location detecting apparatus according to claim 5, wherein when the data analyzing unit finds a search target apparatus includes only one learning port which has learned the plurality of source MAC addresses, the data analyzing unit determines that a network failure location exists in the direction of the one learning port.

8. The network failure location detecting apparatus according to claim 5, wherein the statistical information acquiring unit sends to the search target apparatus including the two learning ports which have respectively learned different source MAC addresses, a message for blocking an interface of either one of the two learning ports to bypass the L2 loop failure.

9. The network failure location detecting apparatus according to claim 5, wherein the network failure location detecting apparatus is constituted by a terminal connected to any one of a plurality of switches disposed in the network.

* * * * *